United States Patent [19]
Meiser et al.

[11] 3,872,117
[45] Mar. 18, 1975

[54] PHENYL-IMIDAZOLYL ACETIC ACID AMINO ALKANOL ESTERS AND AMIDES

[75] Inventors: Werner Meiser; Carl Metzger; Karl Heinz Büchel; Manfred Plempel, all of Wuppertal-Elberfeld, Germany

[73] Assignee: Bayer Aktiengesellschaft, Leverkusen, Germany

[22] Filed: Apr. 30, 1971

[21] Appl. No.: 139,284

[30] Foreign Application Priority Data
May 6, 1970 Germany............................ 2022206

[52] U.S. Cl. 260/247.2 B, 260/247.2 A, 260/308 R, 260/309, 260/310 R, 260/311, 424/248
[51] Int. Cl............................................ C07d 87/42
[58] Field of Search ...... 260/309, 247.5 R, 247.2 P, 260/247.2 B

[56] References Cited
UNITED STATES PATENTS

| 3,399,193 | 8/1968 | Giraldi et al...................... 260/247.5 |
| 3,505,349 | 4/1970 | Beaman et al...................... 260/309 |
| 3,541,109 | 11/1970 | Kauer................................ 260/309 |

OTHER PUBLICATIONS
Gavrilyuk et al., Chemical Abstracts Vol. 62, 5780–5781, (1965).
Buechel et al., Chemical Abstracts Vol. 74, 53800V, (1971).

Primary Examiner—Donald G. Daus
Assistant Examiner—Jose Tovar

[57] ABSTRACT

Antimicrobial aminoalkyl phenyl-azolylalkanoates and N-(aminoalkyl)phenyl-azolylalkanamides and salts thereof are prepared by treatment of the corresponding phenyl-halo-alkanoate or alkanamide with an azolyl compound or saalt thereof, treatment of the corresponding phenyl-hydroxyalkanoate or phenyl-hydroxyalkanamide with an azole compound under dehydration conditions or with a thionyl-bis-azole, or transesterification or amidation of a (lower)alkyl phenyl-azolylalkanoate. A typical embodiment is diphenyl-imidazolyl-acetic acid 1-dimethylamino-2-propyl ester.

13 Claims, No Drawings

PHENYL-IMIDAZOLYL ACETIC ACID AMINO ALKANOL ESTERS AND AMIDES

The present invention relates to basic phenyl-azolyl-fatty acid esters and amides and to the nontoxic salts thereof, to processes for their preparation, to the use of these compounds as chemotherapeutic agents and to chemotherapeutic compositions.

These basic phenyl-azolyl-fatty acid esters and amides can be diagrammatically depicted by the formula:

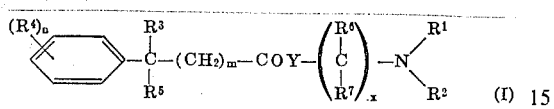
(I)

wherein
R$^1$ and R$^2$ when taken independently of one another are hydrogen or (lower)alkyl, or when taken together with the nitorgen atom to which they are attached form a five to seven-membered heterocyclic ring;
R$^3$ is a five-membered nitrogen-containing heterocyclic radical, unsubstituted or substituted by up to three (lower)alkyl groups;
R$^4$ is hydrogen, (lower)alkyl, (lower)alkyl, (lower)alkyl-mercapto, halogeno, nitro, trifluoromethyl, cyano, (lower)alkylsyulfinyl or (lower)alkylsylfonyl;
R$^5$ is an aliphatic, cycloaliphatic or aromatic radical, unsubstituted or substituted by (lower)alkyl, (lower)alkoxyl, (lower)alkylmercapto, halogeno, nitro, trifluoromethyl, cyano, (lower)alkylsulfinyl or (lower)alkylsulfonyl;
each of R$^6$ and R$^7$ independent of the other, is hydrogen or (lower)alkyl,
Y is oxygen or the

group in which R is hydrogen or (lower) (lower)alkyl,
n is an integer from 1 to 3,
m is an integer from 0 to 6, and
x is an integer from 1 to 10.

These coupounds and their salts have good antimicrobial activity against human-pathogenic, veterinary-pathogenic and plant-pathogenic fungi an yeasts and against bacteria and protozoa, as for example, trypanosomes and trichomonades.

The term "(lower)alkyl" denotes a straight or branched hydrocarbon chain containing from one up to and including six carbon atoms, such as methyl, ethyl, propyl, isopropyl, n-butyl, sec.-butyl, t.-butyl, pentyl, hexyl and the like.

The term "(lower)alkoxy" denotes a straight or branched hydrocarbon chain containing from one to six carbon atoms. With reference to the above formula, R$^1$ and R$^2$ when taken independently of each other can be the same or different and will be either hydrogen or (lower)alkyl. When (lower)alkyl, R$^1$ or R$^2$ will contain preferably one to four, especially one to three, carbon atoms. Methyl, ethyl, n-propyl and isopropyl radicals are particularly preferred. When R$^1$ and R$^2$ are taken together with the nitrogen atom to which they are attached, they form a five to seven-membered heterocyclic ring which can, in addition, contain oxygen, sulphur, or N-(lower)alkyl as a further member of the herterocyclic ring. Preferably this is a six-membered ring which contains, in the p-position to the nitrogn atom to which R$^1$ and R$^2$ are attached, oxygen, sulphur, or N-(lower)aikyl group as a member of the heterocyclic ring; e.g., morpholino.

R$^3$ is a five-membered nitrogen-containing heterocyclic group such as imidazolyl, pyrazolyl, 1,2,4-triazolyl and 1,3,4-triazolyl. These groups, which can be unsubstituted or substituted by up to three (lower)alkyl groups can thus be represented by the following formulas:

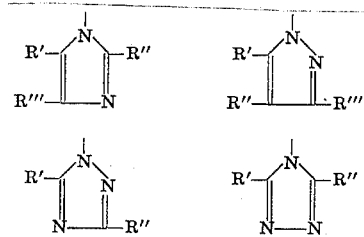

wherein each of R', R'' and R''', independent of the others, is hydrogen or (lower)alkyl, preferably methyl. Particularly preferred are unsubstituted imidazolyl and unsubstituted 1,2,4-triazolyl.

R$^4$ is hydrogen, (lower)alkyl, (lower)alkoxy, (lower)-alkylmercapto, halogeno, such as fluoro, chloro, bromo and iodo, preferably chlorine and bromine, nitro, trifluoromethyl, cyano, (lower)alkylsulfinyl and (lower)alkysufonyl. R$^4$ is preferably hydrogen, chloro or bromo.

R$^5$ can be an aliphatic group, usually a straight-chain or branched alkyl of from one to eight carbon atoms, preferably one to four carbon atoms, alkenyl of two to four carbon atoms, alkynyl of two to four carbon atoms or cycloaliphatic of three to six carbon atoms, preferably five or six carbon atoms, which aliphatic group is unsubstituted or substituted by one or two of the groups enumerated for R$^4$.

R$^5$ can also be an aromatic group containing from six to 10 carbon atoms, unsubstituted or substituted by one or more, preferably 1 or 2, of the groups enumerated for R$^4$. Particularly preferred in this regard are phenyl, chlorophenyl and bromophenyl.

R$^6$ and R$^7$ can be hydrogen or (lower)alkyl, the latter preferably being methyl or ethyl.

Y is oxygen or the

group in which R is hydrogen or (lower)alkyl, the latter preferably being methyl or ethyl.

A preferred subclass of the present invention are those compounds of the formula:

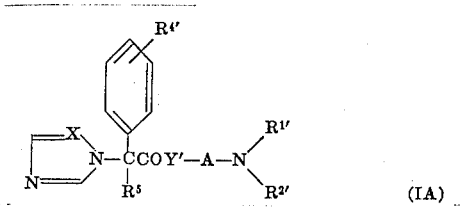
(IA)

in which
X is =CH— or =N—;
Y' is —O— or —NH—;

$R^1$ and $R^2$ when taken independently are hydrogen or (lower)alkyl or when taken together with the nitrogen atom to which they are attached, morpholino;

$R^4$ is hydrogen, (lower)alkyl, (lower)alkoxy, halogeno or nitro;

$R^5$ is (lower)alkyl or phenyl bearing the substituent $R^4$ which is defined above and A is a nongeminal alkylene group of from two to six carbon atoms, and the pharmaceutically acceptable acid addition salts thereof.

The compounds can be employed as the free base or in the form of salts. When used pharmaceutically, the salts should be physiologically acceptable, such as those derived from hydrohalic acids, especially hydrochloric acid and hydrobromic acid, phosphoric acids, monofunctional and bifunctional carboxylic acids and hydroxycarboxylic acids, as for example, acetic acid, maleic acid, succinic acid, fumaric acid, tartaric acid, citric acid, salicylic acid, sorbic acid, lactic acid, 1,5-naphthalene-disulphonic acid and the like.

Since these compounds are dibasic, salts with one or with two acid anions can be produced. Moreover the strongly basic side-chain permits the formation of completely neutral and hydrolysis-resistant salts, which are particularly suitable for injection purposes.

Some of the compounds are listed below by way of example.

a. Diphenyl-imidazolyl-acetic acid dimethylamino-ethyl ester, melting point 46°C.
b. Diphenyl-imidazolyl-acetic acid dimethylamino-ethyl ester, hydrochloride, melting point 185°C.
c. Diphenyl-imidazolyl-acetic acid 1-dimethylamino-2-propyl ester dihydrochloride, melting point 200°C.
d. Diphenyl-imidazolyl-acetic acid 1-dimethylamino-2,3-dimethyl-3-butyl ester dihydrochloride, melting point 130°C.
e. Diphenyl-imidazolyl-acetic acid morpholino-ethyl ester dihydrochloride, melting point 198°C.
f. Diphenyl-imidazolyl-acetic acid 1-morpholino-2-propyl ester, melting point 128°C.
g. Diphenyl-imidazolyl-acetic acid diethylaminopropyl ester, oil.
h. Diphenyl-imidazolyl-acetic acid methylethylamino-ethyl ester oil
i. 4,4'-Dichloro-diphenyl-imidazolyl-acetic acid dimethylamino-ethyl ester dihydrochloride, melting point 170°C.
k. Diphenyl-1,2,4-triazolyl-acetic acid morpholino-2-propyl ester, melting point 118°C.
l. 4,4'-Dibromo-diphenyl-imidazolyl-acetic acid dimethylamino-ethyl ester dihydrochloride.
m. 4,4'-Difluoro-diphenyl-imidazolyl-acetic acid dimethyl-aminoethyl ester dihydrochloride.
n. 4,4'-Dimethyl-diphenyl-imidazolyl-acetic acid 1-dimethyl-amino-2-propyl ester, dihydrochloride.
o. Phenyl-tert-butyl-imidazolyl-acetic acid 1-dimethylamino-2-propyl ester dihydrochloride.
p. Phenyl-isopropyl-imidazolyl-acetic acid 1-dimethylamino-2-propyl ester dihydrochloride.
q. Phenyl-tert.-butyl-1,2,4-triazolyl-acetic acid 1-dimethyl-amino-2-propyl ester dihydrochloride.
r. Phenyl-4-chlorophenyl-imidazolyl-acetic acid 1-dimethyl-amino-2-propyl ester dihydrochloride.
s. Phenyl-2-chlorophenyl-imidazolyl-acetic acid 1-dimethyl-amino-2-propyl ester dihydrochloride.
t. Phenyl-tert-butyl-imidazolyl-acetic acid morpholino-ethyl ester dihydrochloride.
u. 4,4'-Dinitro-diphenyl-imidazolyl-acetic acid 1-dimethylamino-2-propyl ester dihydrochloride.
v. 4,4'-Dimethoxy-diphenyl-imidazolyl-acetic acid 1-morpholino-2-propyl ester.
w. Diphenyl-imidazolyl-acetic acid 1dimethylamino-3-propyl-amide, melting point 120°C.
x. Diphenyl-imidazolyl-acetic acid 1-diethylamino-3-propyl-amide, melting point 113°C.
y. Diphenyl-imidazolyl-acetic acid 1-dimethylamino-2-propyl-amide
z. 4,4'-Dichloro-diphenyl-imidazolyl-acetic acid 1dimethylamino-2-propylamide.

The compounds of formula (I) are prepared according to the process of the present invention as follows:

a. A halogeno derivative of the formula:

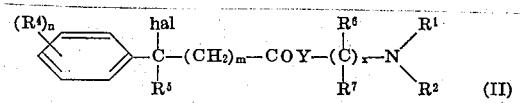

(II)

in which

"Hal" is halogeno, preferably chloro or bromo, is allowed to react with a five-membered nitrogen-containing heterocyclic base of the formula $R^3$—H, in the presence of an acid-binding base, which may be an excess of the heterocyclic base employed, at a temperature of 20 to 140°C, b. the halogeno derivative of formula (II) is allowed to react with an alkali metal salt or silver salt of the five-membered nitrogen-containing heterocyclic base in an inert solvent at a temperature of 20 to 100°C, c. a hydroxy compound of the formula:

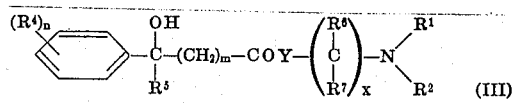

(III)

is allowed to react with the five-membered nitrogen-containing heterocyclic base, with elimination of water, d. the hydroxy compound of formula (III) is allowed to react with approximately the equivalent amount of a thionyl-bisazole of the general formula:

$$R^3—SO—R^3$$

(IV)

in an inert solvent, at a temperature of 0° to 120°C, or e. a compound of the formula:

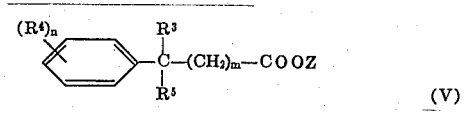

(V)

in which

Z is (lower)alkyl, is allowed to react with a hydroxyamine or diamine of the general formula:

(VI)

in which

Q is hydroxy or RHN— in which R is hydrogen or (lower) (lower)alkyl.

Generation of salts can then be effected from the compounds so obtained.

In process variant (a), the reactants are employed in approximately molar ratios if an acid-binding base such as a tert.-alkylamine, e.g., triethylamine, is employed. If the heterocyclic compound is used as the acid-binding base, about 2 mols of the heterocyclic base should be employed per mol of the compounds of the general formula (II). The reaction is carried out at temperatures from 20° to 140°°C, preferably at 50° to 100°C, in an inert, polar, organic solvent as for example (lower)alkyl nitriles such as acetonitrile, aromatic solvents such as toluene, xylene or chlorobenzene, (lower)aliphatic or cycloaliphatic solvents such as cyclohexane, di(lower)alkyl-ketones such as acetone, liquid amides such as dimethylformamide and sulphoxides such as dimethylsulphoxide.

In process variant (b), the reactants are preferably reacted in approximately molar ratios. The reaction is preferably performed in an inert organic solvent such as benzene, toluene, xylene, cyclohexane or the like, at temperatures from 20° to 120°C, preferably 50° to 100°C.

In process variant (c), the reactants are also employed in approximately molar amounts. The elimination of water is carried out accordinig to the customary methods, as for example in a melt or azeotropically in the presence of higher-boiling solvents such as xylene, chlorobenzene and the like, at the boiling point of the particular solvent. It is often desirable to additionally employ dehydrating agents such as anhydrous alkaline earth oxides (MgO, BaO or CaO) and/or aluminum oxide to facilitate the splitting off or water.

In process variant (d), the ractants of the general formulae (III) and (IV) ar generally employed in approximately molar amounts in an inert organic solvent. Suitable solvents include aromatic solvents such as benzene or toluene, di(lower)-alkyl ethers such as diethyl ether, chlorinated hydrocarbons such as methylene chloride, chloroform and carbon tetrachloride, and (lower)alkylnitriles such as acetonitrile. Acetonitrile is particularly preferred. The reaction is carried out at temperatures of from 0° to 120°C, preferably 20 to 80°C.

In process variant (e), the reactants of the formulae (V) and (VI) can be used in approximately molar amounts but it is generally desirable to employ an excess of the aminoalkanol or diaminoalkane. This can, for example, be up to a 30-fold excess. The reaction is performed at temperatures of from 0 to 100°C, preferably at room temperature (about 20°C).

The starting compounds required for the manufacture of the new compounds are known or are obtainable according to known processes.

The course of the processes according to the invention can, by way of example, be seen from the following:

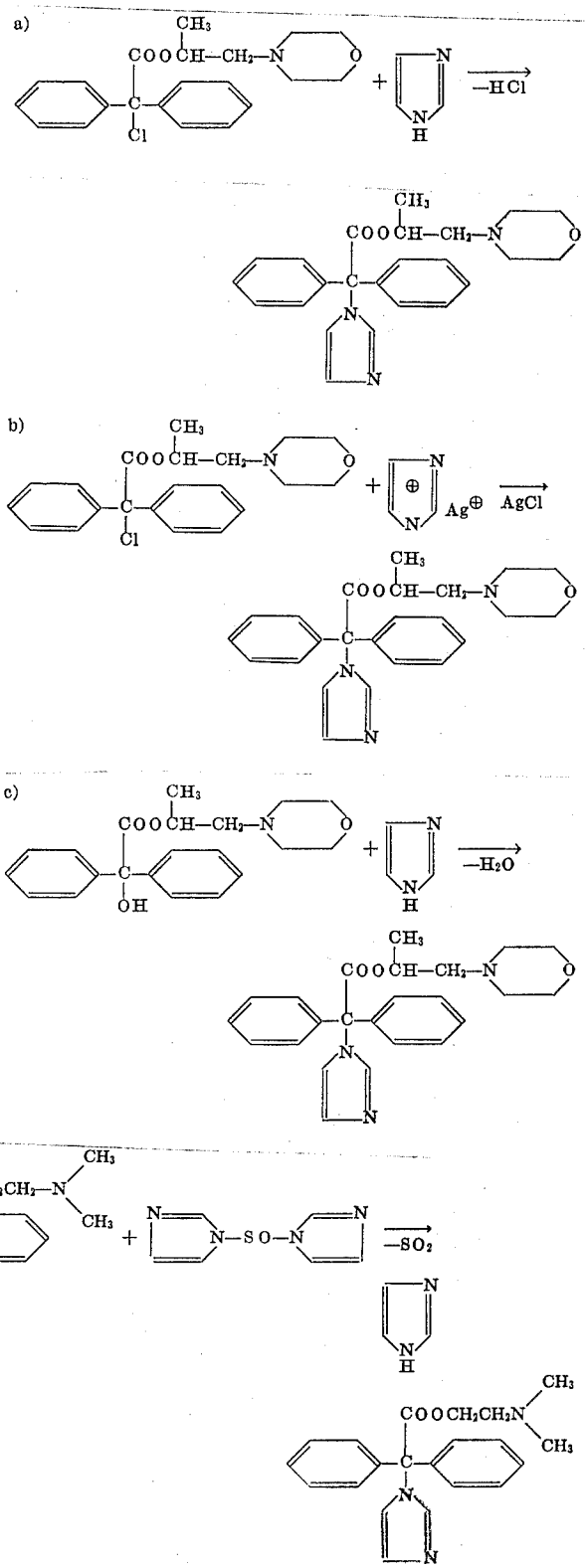

e)

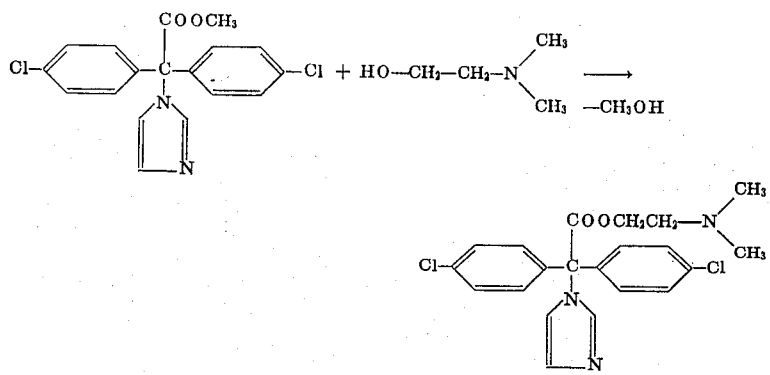

The following examples will serve to further typify the nature of the present invention without being a limitation on the scope thereof:

EXAMPLE 1

Diphenyl-imidazolyl-acetic acid 1-morpholino-2-propyl ester

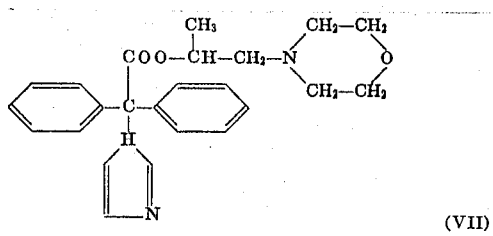

(VII)

56 g of diphenyl-chloroacetic acid 1-morpholino-2-propyl ester (hydrochloride of the formula (VIII) and 37 g of imidazole, in 370 ml of acetonitrile, are heated for 17 hours under reflux. The acetonitrile is distilled off in vacuo. The residue is acidified with 800 ml of water, with the addition of dilute hydrochloric acid, and is twice extractd with ether (the ether phase is discarded). The aqueous solution is rendered alkaline with sodium carbonate solution and is extracted with ether. The ether is subsequently twice extracted by shaking with 200 ml of water at a time, and is then briefly dried. After evaporating the ether in vacuo, the residue is recrystallised from ethyl acetate. The compound VII obtained in this way has a melting point of 128°C. The hydrochloride of the compound can be obtained in the usual manner.

The diphenyl-chloroacetic acid 1-morpholino-2propyl ester (hydrochloride of the formula (VIII) employed as the staring material is obtained as follows:

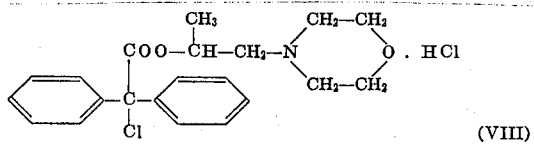

(VIII)

53 g (0.2 mol) of diphenyl-α-chloroacetic acid chloride (Chem. Ber. 22, 1538) are dissolved in 200 ml of ethyl acetate. 29.5 g of N-(2-hydroxypropyl)-morpholine are added dropwise thereto, while cooling in ice. The oil thereby obtained turns crystalline after stirring overnight at about 50°C. After cooling, the hydrochloride is filtered and washed with ethyl acetate. 64 g of the compound VIII, melting at 210°C with decomposition, are obtained. The remaining compounds of this type are obtainable analogously. The free bases can be manufactured from the hydrochlorides according to customary methods.

EXAMPLE 1a

Diphenyl-imidazolyl-acetic acid 1morpholino-2-propyl ester (VII) is also obtained if 17.5 g of the finely powdered silver salt of imidazole together with 36.8 g of diphenyl-chloroacetic acid 1-morpholino-2-propyl ester are suspended in absolute benzene and heated to the boil for about 4 hours while stirring and excluding light.

After filtering off the silver chloride and the hydrochloride product, the mixture is taken up in dilute hydrochloric acid, whereupon the silver chloride is left.

The aqueous solution is rendered alkaline with sodium carbonate solution and is extracted with ether. After drying the ether solution and evaporating off the ether, the residue is recrystallised from ethyl acetate. Melting point 128°C.

EXAMPLE 2

4,4'-Dichlorodiphenyl-imidazolyl-acetic acid dimethylamino-ethyl ester

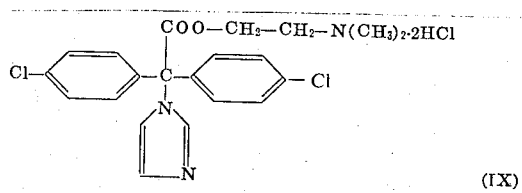

(IX)

33 g of 4,4'-dichlorodiphenyl-chloroacetic acid dimethyl-amino-ethyl ester (hydrocloride of the formula (X) and 21.1 g of imidazole, in 210 ml of acetonitride, are heated for 17 hours under reflux. The acetonitrile is distilled off in vacuo. The residue is treated with 500 ml of water, acidified with dilute hydrochloric acid and twice extracted with ether (the ether phase is discarded). The aqueous solution is rendered alkaline with sodium carbonate solution and is extracted with methylene chloride. The methylene chloride solution is twice more extracted with 125 ml of water at a time, dried, and the methylene chloride distilled off in vacuo. The residue is extracted three times by boiling with absolute ether, whereupon a semi-solid residue is left. Hydrogen chloride in ether yields the hydrochloride, which is obtained in a semi-solid form which after treatment with ethyl acetate crystallises after some time.

The hydrochloride of 4,4'-dichlorodiphenylimidazolyl-acetic acid dimethylamino-ether ester, of melting point 170°C (decomposition) is thus obtained. The free base can be obtained from the hydrochloride in the customary manner.

The 4,4'-dichlorodiphenyl-chloroacetic acid dimethyl-amino-ethyl ester (hydrochloride (X)), employed as the starting compound, is obtained as follows:

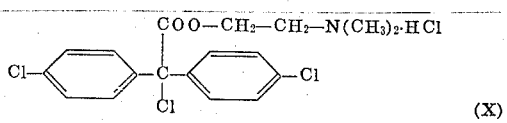

(X)

33.4 g (0.1 mol) of 4,4'-dichlorodiphenyl-α-chloroacetic acid chloride (manufactured analogously to Ber. 22, 1538 from 4,4'-dichlorobenzilic acid and phosporus pentachloride, of melting point 55°) are dissolved in 120 ml of ethyl acetate. 9.2 g (0.1 mol) of N,N-dimethyl-ethanol-amine are added dropwise thereto, while cooling in ice. After stirring overnight at room temperature, the hydrochloride of 4,4'-dichlorodiphenyl-α-chloroacetic acid dimethylamino-ethyl ester is filtered off and washed. Yield, 34 g of melting point 153°C.

The remaining starting compounds of this type are obtainable analogously. The free bases can be obtained according to the customary methods.

EXAMPLE 3

Diphenyl-imidazolyl-acetic acid dimethylamino-ethyl ester

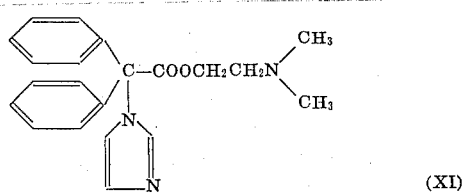

(XI)

29.8 g (0.1 mol) of benzilic acid dimethylamino-ethyl ester, dissolved in a little acetonitrile, are slowly added dropwise, at 35°C, to a solution of 18.2 g (0.1 mol) of thionyl-bis-imidazole (Angew. Chem. 73, 26 (1961)) in 500 ml of acetonitrile. $SO_2$ is immediately evolved. To complete the evolution of gas, the mixture is subsequently stirred for a further 3 hours at about 80°C. The cooled reaction mixture is completely evaporated in vacuo, and the residue is treated with 500ml of ether and thoroughly washed with water. After drying the ether solution over potassium carbonate, teh product is precipitated with hydrogen chloride in ether. The hydrochloride of diphenyl-imidazolyl-acetic acid dimethylamino-ethyl ester is recrystallised from isopropanol, and has a melting point of 185°–186°C.

To prepare the free base, the hydrochloride is dissolved in chloroform and shaken with 10 percent strength squeous sodium hydroxide solution. After drying over potassium carbonate, the solution is completely evaporated in vacuo. The residue crystallises on addition of petroleum ether. It can be recrystallised from petroleum ether: ethyl acetate = 4 : 1. Melting point 85°–86°C.

EXAMPLE 4

4,4'-Dichlorodiphenyl-imidazolyl-acetic acid acid dimethylamino-ethyl ester

This compound is of formula (IX) above.

10 g (0.023 mol) of 4,4'-dichlorodiphenyl-imidazolyl-acetic acid methyl ester are added to a solution of 0.01 g of sodium in 50 ml of dimethylamino-ethanol, and the mixture is kept for 7 days at room temperature. The excess of basic ether is then dissolved, carefully washed with water, dried over potassium chloride and subsequently precipitated with hydrogen chloride in ether. The dihydrochloride of 4,4'-dichlorodiphenyl-imidazolyl-acetic acid dimethylamino-ethyl ester, thus obtained, is recrystallised from ethanol-ethyl acetate and has a melting point of 170°C (decomposition). The free base can be obtained in the customary manner.

The 4,4'-dichlorodiphenyl-imidazolyl-acetic acid methyl ester used as the starting material is obtained as follows: 162.6 g (0.434 mol) of 4,4'-dichlorodiphenyl-bromoacetic acid methyl ester (manufactured from 4,4'-dichlorobenzilic acid methyl ester and phosphorus pentabromide (boiling point 190°C/0.5 mmHg)) and 90 g (1.32 mols) of imidazole in 1 litre of acetonitrile are heated for 14 hours to the boil, while stirring. The acetonitrile is distilled off in vacuo. To remove imidazole, the residue is twice shaken with 1.3 litres of water at a time, and then taken up in 950 ml of methylene chloride and again extracted by shaking with 1.8 litres of water. After drying with sodium sulphate, the methylene chloride is distilled off in vacuo. The residue is extracted by boiling four times with 250 ml of ether at a time, and the ether solution is clarified with charcoal and then precipitated with hydrogen chloride in ether. The precipitate is digested with absolute ether, taken up in methylene chloride, and the solution treated with ethyl acetate after filtration. On evaporating the methylene chloride in a waterbath, the hydrochloride of bis-(4-chlorophenyl)-imidazolyl-acetic acid methyl ester of metling point 150°C (with decomposition) crystallises out in colourless crystals.

If the hydrochloride is shaken with methylene chloride and sodium carbonate solution, a solution of the base is obtained. After drying this solution, the solvents are distilled off in vacuo and the residue is recrystallised from dry ether. Colourless crystals of bis-(4-chlorophenyl)-imidazolyl-acetic acid methyl ester melting point 132°C are thus obtained.

EXAMPLE 5

Diphenyl-1,2,4-triazolyl-1-acetic acid 1-morpholino-2-propyl ester

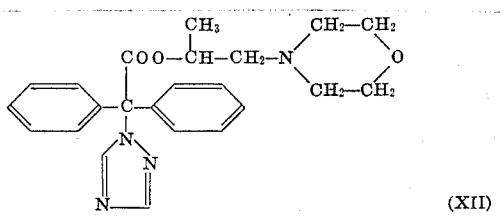

(XII)

35 g of the compounds (VIII) swaxeivws in Example 1 and 15.6 g of 1,2,4-triazole in 230 ml of acetonitrile are heated to the boil for 20 hours under reflux. The acetonitrile is distilled off in vacuo, and the residue is treated with 500 ml of water, rendered acid with dilute hydrochloric acid and twice extracted with ether (the ether phase is discarded). The aqueous solution is rendered alkaline with sodium carbonate solution and is extracted three times with ether. The ether is subsequently twice extracted with 125 ml of water at a time, dried and distilled off in vacuo. The residue is recrystallised from ether or from ethyl acetate. Diphenyl-1,2,4-triazolyl-acetic acid morpholino-2-propyl ester of melting point 118°C is thus obtained; its hydrochloride can be manufactured in the usual manner.

EXAMPLE 6

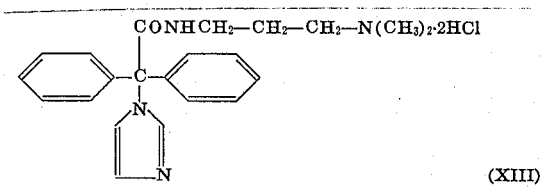

(XIII)

36.7 g of the compound (XIV) obtained as described below, and 27 g of imidazole, in 270 ml of acetonitrile are heated for 17 hours under reflux. The acetonitrile is distilled off in vacuo. The residue is dissolved in 600 ml of water, rendered acid with dilute hydrochloric acid and twice extracted with ether (the ether phase is discarded). The aqueous solution is rendered alkaline with sodium carbonate solution and is extracted with ether. The ether is further extracted twice with 150 ml of water at a time, dried and evaporated in vacuo. The solid residue, consisting of the compound XIII, is recrystallised from about 750 ml of ligroin. The compound (XIII) thus obtained has a melting point of 120°C. The hydrochloride of the compound can be obtained in the usual manner.

The compound (XIV) required as a starting component is obtained as follows:

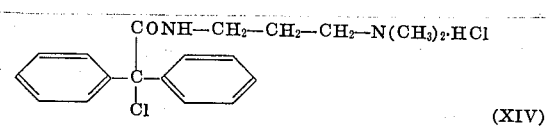

(XIV)

53 g (0.2 mol) of diphenyl-α-chloroacetic acid chloride are dissolved in 200 ml of ethyl acetate. 21 g (0.2 mol) of 1-amino-3-dimethlamino-propane are added dropwise thereto, while cooling in ice. After stirring over-night, the hydrochloride is filtered off and washed with ethyl acetate. The compound (XIV) has a melting point of 135°C and is obtained in a yield of 67 g. The free base can be obtained from the hydrochloride according to customary methods. The remaining staring compounds of this type can be manufactured analogously.

EXAMPLE 7

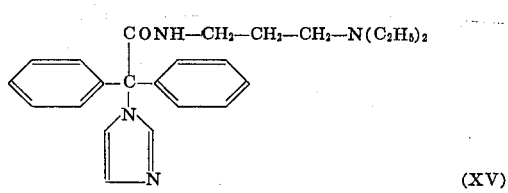

(XV)

39.5 g of the compound (XVI) obtained as described below and 27 g of imidazole in 270 ml of acetonitrile are heated under reflux for 17 hours. Working-up takes place analogously to Example 6. The product is recrystallised from ligroin. The compound XV thus obtained has a melting point of 113°C. The free base can be converted into the hydrochloride in the usual manner.

The compound (XVI) required as a starting component is obtained as follows:

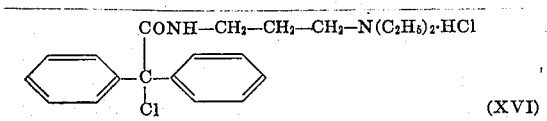

(XVI)

53 g (0.2 mol) of diphenyl-α-chloroacetic acid chloride are dissolved in 200 ml of ethyl acetate. 27 g (0.2 mol) of 1-amino-3-diethylamino-propane are added dropwise thereto, while cooling in ice. After stirring over-night, the hydrochloride is filtered off and washed with ethyl acetate. The compound XVI has a melting point of 130°C and is obtained in a yield of 67 g. The free base can be manufactured from the hydrochloride according to customary methods. The starting compounds of the same type are obtainable analogously.

EXAMPLE 8

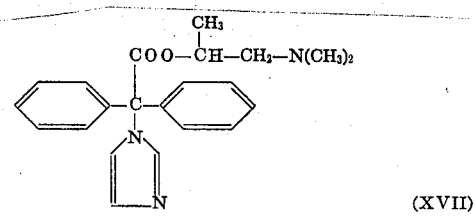

(XVII)

31.3 g of diphenyl-hydroxyacetic acid dimethylamino-isopropyl ester (J. pr. [4], 16, 258) are mixed with 13.6 g of imidazole and heated to 180°C for about 5 hours.

The mixture is digested with a large amount of water to remove excess imidazole. The residue is taken up in ether and the dihydrochloride of diphenyl-imidazolyl-acetic acid 1-dimethylamino-2-propyl ester is precipitated with a solution of hydrogen chloride in ether and is recrystallised from isopropanol-ethyl acetate; it melts at 200°C.

EXAMPLE 9

Diphenyl-imidazolyl-acetic acid dimethylamino-ethyl ester of melting point 85°–86°C (and its hydrochloride, of melting point 185°–186°C) is obtained in accordance with Example 1 from diphenyl-chloroacetic acid dimethylaminoethyl ester hydrochloride of melting point 175°C (manufactured from diphenyl-α-chloroacetic acid chloride and dimethylaminoethanol) and imidazole.

EXAMPLE 10

Diphenyl-imidazolyl-acetic acid dimethylamino-ethyl ester, melting point 85°–86°C (and its hydrochloride, melting point 185°–186°C) are manufactured in accordance with Example 4 from diphenyl-imidazolyl-acetic methyl ester (melting point 155°C) and dimethylaminoethanol.

The diphenyl-imidazolyl-acetic acid methyl ester required as the starting compound is obtained as follows:

13 g of diphenyl-chloroacetic acid methyl ester (0.05 mol) (boiling point 140°C/0.1 mmHg, prepared from diphenyl-chloro-acetic acid chloride and methanol according to Ber. 22, 1537) and 10 g of imidazole in 100 ml of acetonitrile are heated to the boil for 18 hours. After distilling off the solvent in vacuo, 50 ml of water are added and the mixture is extracted with chloride. After drying over sodium sulphate, the solvent is distilled off in vacuo and the residue is recrystallised from a little ethyl acetate. Diphenyl-imidazolyl-acetic acid methyl ester is thus obtained in colourless crystals of melting point 155°C (with decomposition).

EXAMPLE 11

The dihydrochloride of diphenyl-imidazolyl-acetic acid 1-dimethylamino-2-propyl ester of melting point 200°C is obtained from diphenyl-α-chloroacetic acid 1-dimethylamino-2-propyl ester hydrochloride and imidazole according to Example 1. The free base can be manufactured from the salt in the usual manner.

EXAMPLE 12

Diphenyl-α-chloroacetic acid dimethylamino-2,3-dimethyl-3-butyl ester hydrochloride (melting point 160°) and imidazole in accordance with Example 1 yield the dihydrochloride of diphenyl-imidazolyl-acetic acid 2-dimethylamino-2,3-dimethyl-3-butyl ester of melting point 130°C, from which the free base is obtainable in the usual manner.

EXAMPLE 13

The dihydrochloride of diphenyl-imidazolyl-acetic acid morpholino-ethyl ester of melting point 198°C is obtainable in accordance with Example 1 from diphenyl-α-chloroacetic acid morpholino-ethtyl ester hydrochloride (melting point 120°C) and imidazole. The free base can be obtained in the usual manner.

EXAMPLE 14

Diphenyl-α-chloroacetic acid diethylamino-propyl ester hydrochloride (melting point 123°C) and imidazole in accordance with Example 1 yield diphenyl-imidazolyl-acetic acid diethyl-amino-propyl ester as an oil. The free base can be converted into salts in the usual manner.

EXAMPLE 15

Diphenyl-α-chloroacetic acid methyl-ethylamino-ethyl ester hydrochloride (melting point 98°C) and imidazole in accordance with Example 1 yield diphenyl-imidazolyl-acetic acid methyl-ethylamino-ethyl ester as an oil, from which salts can be manufactured in the usual manner.

EXAMPLE 16

4,4′-Dibromodiphenyl-imidazolyl-acetic acid methyl ester (melting point 135°C) and dimethylamino-ethanol in accordance with Example 4 yield 4,4′-dibromodiphenyl-imidazolyl-acetic acid dimethylamino-ethyl ester, from which salts can be manufactured in the usual manner.

The 4,4′-dibromodiphenyl-imidazolyl-acetic acid methyl ester employed as the starting compound is obtained as follows: 19.4 g of 4,4′-dibromodiphenyl-bromoacetic acid methyl ester (manufactured from 4,4′-dibromodiphenyl-acetic acid methyl ester and bromosuccinimide) and 8.4 g of imidazole in 8.5 ml of acetonitrile are heated to the boil for 15 hours. The acetonitrile is distilled off in vacuo. The residue is twice shaken with 110 ml of water at a time, and decanted. The residue is then taken up in approx. 100 ml of methylene chloride and again extracted by shaking with 80 ml of water. After drying the methylene chloride, the latter is distilled off in vacuo. The residue is extracted four times by boiling with 100 ml of absolute ether at a time. The ether is clarified with charcoal and the product precipitated with a solution of hydrogen chloride in ether. The hydrochloride, which precipitates in lumps, is twice digested with absolute ether and is then taken up in methylene chloride. After filtering the solution, ethyl acetate is added, and the methylene chloride is evaporated off on a waterbath. After cooling, the hydrochloride of bis-(4-bromophenyl)-imidazolyl-acetic acid methyl ester of melting point 140°C crystallises out in colourless crystals.

The hydrochloride is shake with methylene chloride and sodium carbonate solution. The solution of the base in methylene chloride is dried and the methylene chloride is distilled off in vacuo. The residue is recrystallised from a little absolute ether. Colourless crystals of bis-(4-bromophenyl)-imidazolyl-acetic acid methyl ester of melting point 135°C are thus obtained.

EXAMPLE 17

Bis-(4-fluorophenyl)-imidazolyl-acetic acid methyl ester (melting point 128°C) and dimethylaminoethanol in accordance with Example 4 yield 4,4′-difluoro-diphenyl-imidazolyl-acetic acid dimethylamino-ethyl ester, from which salts can be obtained in the usual manner. The bis-(4-fluorophenyl)-imidazolyl-acetic acid methyl ester used as the starting compound is manufactured as described in Example 4: 40.1 g of 4,4′-difluoro-diphenyl-bromoacetic acid methyl ester (boiling point 143°C/0.4 mmHg, prepared from 4,4′-difluoro-diphenyl-acetic acid methyl ester and N-bromosuccinimide) and 23.6 g of imidazole in 236 ml of acetonitrile yield the hydrochloride of bis-(4-fluorophenyl)-imidazolyl-acetic acid methyl ester of melting point 147°C. The free base, of melting point 128°C, is prepared from this in methylene chloride by means of sodium carbonate solution.

EXAMPLE 18

Bis-(4-tolyl)-imidazolyl-acetic acid methyl ester (melting point 140°C) and dimethylamino-2-propanol in accordance with Example 4 yield 4,4′-dimethyl-diphenyl-imidazolyl-acetic acid 1-dimethylamino-2-propyl ester, from which salts can be obtained in the usual manner.

The bis-(tolyl)-imidazolyl-acetic acid methyl ester employed as the starting compound is manufactured analogously to the starting compound described in Example 4: 13.3 g of 4,4′-ditolyl-α-bromoacetic acid methyl ester and 10 g of imidazole in 100 ml of acetonitrile yield the hydrochloride of bis-(4-tolyl)-imidazolyl-acetic acid methyl ester of melting point 140°C (with decomposition), in the form of colourless crystals from which the base is liberated in the usual manner.

EXAMPLE 19

Phenyl-tert.-butyl-imidazolyl-acetic acid methyl ester and dimethylamino-2-propanol in accordance with Example 4 yield phenyl-tert.-butyl-imidazolyl-acetic acid 1dimethyl-amino-2-propyl -ester, from which salts can be manufactured in the usual manner.

EXAMPLE 20

Phenyl-isopropyl-imidazolyl-acetic acid ethyl ester and dimethylamino-2-propanol in accordance with Example 4 yield phenyl-isopropyl-imidazolyl-acetic acid 1-dimethylamino-2-propyl ester, from which salts can be manufactured in the usual manner.

The phenyl-isopropyl-imidazolyl-acetic acid ethyl ester employed as the starting compound is obtained as follows: 12 g of phenyl-isopropyl-chloroacetic acid ethyl ester (boiling point 95°C/0.3 mmHg) (0.05 mol) and 10 g of imidazole and 100 ml of acetonitrile are heated to the boil for 18 hours. After distilling off the solvent in vacuo, the residue is treated with 50 ml of water and extracted by shaking with methylene chloride. The methylene chloride is dried and distilled off in vacuo. Phenyl-isopropyl-imidazolyl-acetic acid ethyl ester is thus obtained as an oil.

EXAMPLE 21

Phenyl-tert.-butyl-1,2,4-triazolyl-acetic acid methyl ester and dimethylamino-2-propanol in accordance with Example 4 yield phenyl-tert.-butyl-1,2,4-triazolyl 1dimethylamino-2-propyl ester, from which salts can be manufactured in the usual manner.

EXAMPLE 22

Phenyl-4-chlorophenyl-imidazolyl-acetic acid methyl ester and dimethylamino-2-propanol in accordance with Example 4 yield phenyl-4-chlorophenyl-imidazolyl-acetic acid 1-dimethyl-amino-2propyl ester, from which salts can be manufactured according to the usual method. The phenyl-4-chlorophenyl-imidazolyl-acetic acid methyl ester (melting point 135°) employed as the starting compound is obtained from phenyl-p-chlorophenyl-chloroacetic acid methyl ester (from p-chlorophenyl-magnesium bromide and benzoyl-formic acid ethyl ester,) subsequent treatment with thionyl chloride (boiling point 160°C/0.2 mmHg) and imidazole in acetonitrile at the boil.

EXAMPLE 23

Phenyl-2-chlorophenyl-imidazolyl-acetic acid 1-dimethylamino-2-propyl ester is obtained in accordance with Example 4 from phenyl-2-chlorophenyl-imidazolyl-acetic acid methyl ester (melting point 138°C) and dimethylamino-2-propanol. Salts can be manufactured in the usual manner. The phenyl-2-chlorophenyl-imidazolyl-acetic acid methyl ester (melting point 78°C) employed as the starting compound is obtained from phenyl-2-chlorophenyl-chloroacetic acid methyl ester and imidazole in acetonitrile.

EXAMPLE 24

4,4'-Dinitro-diphenyl-imidazolyl-acetic acid 1-dimethyl-amino-2-propyl ester is obtained in accordance with Example 4 from 4,4'-dinitro-diphenyl-imidazolyl-acetic acid ethyl ester (melting point 130°C) and dimethylamino-2-propanol. The 4,4'-dinitro-diphenyl-imidazolyl-acetic acid ethyl ester required as the starting compound is manufactured from 4,4'-dinitro-diphenyl-bromoacetic acid ethtyl ester (melting point 130°C) (prepared from 4,4'-dinitro-diphenyl-acetic acid ethyl ester and N-bromosuccinimide) and imidazole in acetonitrile.

EXAMPLE 25

4,4'-Dimethoxy-diphenyl-imidazolyl-acetic acid 1-morpholino-2-propyl ester is obtained in accordance with Example 4 from 4,4'-dimethoxy-diphenyl-imidazolyl-acetic acid methyl ester (melting point 131°C) and morpholino-2-propanol.

The 4,4'-dimethoxy-diphenyl-imidazolyl-acetic acid methyl ester (melting point 131°C) employed as the starting compound is obtained from 4,4'-dimethoxy-benzilic acid methyl ester (melting point 110°C) by treatment with phosphorus pentachloride and subsequent reaction with imidazole.

As has already been mentioned, the new compounds of the invention, both the free bases and their salts, show chemotherapeutic activity. Their chemotherapeutic action can be conveniently observed in animals experiments (orally and parenterally) and in vitro. The compounds show very good activity, with a broad spectrum of action, against human-pathogenic and veterinary-pathogenic fungi, which permits their use in human medicine, and also in veterinary medicine.

Table 1 lists, by way of example, the minimum inhibitory concentrations (MIC) of a number of representative compounds (a – k) against various species of fungi. The MIC data are expressed in γ/ml of substrate.

The following were used as nutrient substrates:
a. for dermatophytes — Sabouraud's test medium.
b. for blastomycetes, histoplasma, coccicoides and others — meat extract — glucose — bouillon.

The incubation temperature was 28°C and the incubation time was 24–96 hours.

Table 1

| Com-pound | MIC in γ/ml for | | | |
|---|---|---|---|---|
| | Trich.*) ment. | Candida Microsporon | Aspergillus | Penicillium |
| a) | 100 | 100 | 100 | 100 | 100 |
| b) | 100 | 100 | 100 | 100 | 100 |
| c) | 100 | 10 | 100 | 50 | 100 |
| d) | 100 | 10 | 50 | 50 | 50 |
| e) | 20 | 4 | 20 | 20 | 20 |
| f) | 40 | 4 | 40 | 40 | 20 |
| g) | 100 | 100 | 100 | 100 | 100 |
| h) | <1 | 20 | 1 | 1 | 4 |
| i) | 4 | 4 | 4 | 4 | 10 |
| k) | 100 | 100 | 100 | 50 | 50 |

*) Trichophyton mentagrophytes

The above in vitro data corresponds to in vivo activity, as described below.

1. Candidosis

Male CF$_1$–SPF mice weighing 18–22 g (pellet fodder, water ad libitum) are infected with 0.2 ml of a suspension of Candida albicans cells, containing 5 × 10$^6$ germs per 1 ml (24 hour culture, centrifuged and washed), through injection into the vein of the tail. Table 2 lists the survival proportion of treated animals, in comparison to the untreated control group, for certain preparations, by way of examples:

Table 2

| Com-pound | Survival Proportion in %, on the 6th. day after infection | |
|---|---|---|
| | untreated control group | group treated 2 × daily with 100 mg/ kg |
| c | 5 | 90 |

Table 2-Continued

| Compound | Survival Proportion in %, on the 6th. day after infection | |
|---|---|---|
| | untreated control group | group treated 2 × daily with 100 mg/kg |
| d | 0 | 75 |
| e | 0 | 80 |
| f | 5 | 40 |
| i | 5 | 80 |

The therapy was carried out 2 × daily, orally or parenterally, in doses of 100 mg/kg of body weight, starting on the day of infection (1–3 hours before infection and 4–6 hours after infection), up to the fifth day after infection. 50 animals were employed per therapy group.

This result demonstrates a good therapeutic action of the preparations mentioned against systemic mycoses caused by candida, if the preparations are administered orally or parenterally.

2. Trichophyton quinckeanum trichophytosis

The development of experimental trichophytosis in mice by Trichophyton quinckeanum can be largely prevented especially with preparations e, h and i on oral administration of 2 × 50 mg/kg of body weight from the 1st. to the 10th. day after infection. Of the treated aminals, 4–7 out of 20 showed typical scutula at the point of infection on the 16th day following infection, while typical scutula were shown by 17–19 out of 20 in the case of the untreated control animals.

3. Mentagrophytes trichophytosis

The preparations were used locally, as a 1 percent strength solution in polyethylene glycol 400 or 4:6 dimethylsulphoxide/water mixture, once daily from the third to the 16th day following infection, by application to the point of infection in guinea pigs with dermatomycoses from Trichophyton mentagrophytes experimentally applied to the shaven backs. With this form of application, the dermatomycosis can be markedly shorotened in duration, especially with preparations e, f, h and i: healing taking place on the 12th – 16th day following infection in the case of the treated animals, while in the case of the untreated control group the infection was still present on the 30th day following infection.

c. Pharmacokinetics

The preparations are resorbed well and rapidly after oral administration; at doses of 100 mg/kg of body weight, maximum blood levels are found 3–5 hours after administration, the level being 3.5 – 7 γ/ml of serum. The serum half-life in mice is 6 – 7 hours and the substance is predominantly eliminated — in a partially metabolized form — through the faeces via the bile.

The acute toxicity of the substances mentioned, when administered orally, lies between 450 and 900 mg/kg of body weight for the various species of animals.

In view of their activity, the compounds, including their salts, can be employed in human medicine for the treatment of dermatomycoses by varieties of Trichophyton, Microsporon and Epidermophyton, of organic mycoses and skin mycoses caused by blastomycetes such as Candida albicans, Sporotrichum Schenckii, Histoplasma capsulatum Blastomyces dermatitidis and Coccidiodes immitis, of skin mycoses and organic mycoses caused by moulds and as varieties of Aspergillus, Penicillium, Chromomycetes and other pathogenic fungi. The compounds, including their salts are also useful in veterinary medicine for organic mycoses and dermatomycoses caused by Dermatophytes, yeasts, blastomycetes, and moulds.

In general, effective results are achieved through administration of from about 100 mg to about 300 mg per kilogram of body weight per day in oral or parenteral treatment. Nevertheless, it can at times be necessary to deviate from these amounts, and in particular to do so as a function of the body weight of the test animal, the nature of the type of administration, the species of animal, the individual's response to the therapy, the formulation of the medicine or the point in time, or interval, at which the substance is administered. Thus it can suffice in some cases to manage with less than about 100 mg/kg, while in other cases the upper limit of 300 mg/kg must be exceeded. When larger amounts are administered, it is often desirable to divide the total dosage into several individual administrations over the course of the day.

The basic phenyl-azolyl-fatty acid esters and amides, as the free base or as a salt thereof, can be employed as such or in combination with pharmaceutically acceptable carriers and administered in such forms as tablets, capsules, powders, sprays, aqueous or nonaqueous suspensions, emulsions, solutions, including injectable solutions, elixirs, syrups and the like. Carriers or excipients include solid diluents or fillers, sterile aqueous medium, various non-toxic organic solvents and the like. The therapeutically active compound is present in a concentration of about 0.5 to 90 percent by weight of the total mixture in amounts sufficient to provide the above-mentioned dosage upon administration according to the dosage regimen.

In the case of oral usage, tablets can, of course, also contain sweetening agents, additives such as sodium citrate, calcium carbonate and dicalcium phosphate, carriers such as potato starch, and binders such as polyvinylpyrrolidone, gelatine and the like, lubricants, such as magnesium stearate, sodium lauryl sulphate and talc. In the case of aqueous suspensions or elixirs intended for oral usages, the active substance can be used together with various substances for improving the flavour, dyestuffs, emulsifiers and/or diluents, such as water, ethanol, propylene glycol, glycerine and similar compounds or combination thereof.

For parenteral usage, one can employ solutions of the active substances in non-aqueous excipients, as for example vegetable fatty oils, such as sesame oil, groundnut oil, corn oil and cottonseed oil, or in aqueous propylene glycol or N,N-dimethylfornamide, dimethylsulphoxide and similar nonaqueous excipients which neither reduce the activity of the active substances nor are toxic in the dosages used. Sterile aqueous solutions of water-soluble compounds can also be employed. Such aqueous solutions are buffered in the usual manner if required, and the liquid diluent being first adjusted to an isotonic level by adding the requisite amount of salt or glucose. Such aqueous solutions are especially suitable for intravenous, intramuscular and intraperitoneal injections. Preparations for injections can furthermore contain local anaesthetics or substances which promote the spread of the active substances, such as, for example, hyaluronidase.

The preparation of such sterile aqueous media is effected in a known manner.

Powders containing solid excipients and solutions, emulsions and suspensions in an aqueous and non-aqueous medium, predominantly in concentrations of about 0.5 to 5 percent, preferably 1 percent, can be used for local administration.

The compounds according to the invention can also be administered in tablets, pastilles, dragees, ampoules and the like.

The invention also provides a medicament in unit dosage form comprising at least one of the new active compounds either alone or in admixture with a pharmaceutically acceptable solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or sub-multiple of a unit dose of the active compound or compounds, for example two, three or four unit doses, or half, a third, a quarter or a fifth of a unit dose. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. A compound of the formula:

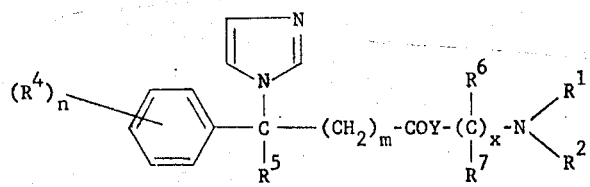

wherein
- $R^1$ and $R^2$ when taken independently of one another are hydrogen or (lower)alkyl of one to three carbon atoms, or when taken together with the nitrogen atom to which they are attached are morpholino;
- $R^4$ is hydrogen, (lower)alkyl of one to three carbon atoms, (lower)alkoxy of one to three carbon atoms, halogeno, or nitro;
- $R^5$ is lower alkyl of one to four carbon atoms or phenyl unsubstituted or substituted by one (lower)alkyl of one to three carbon atoms, (lower)alkoxy of one to three carbon atoms, halogeno, or nitro group;
- each of $R^6$ and $R^7$, independent of the other, is hydrogen or of one to three carbon atoms;
- Y is oxygen or —NH—;
- $n$ is 1;
- $m$ is 0; and
- $x$ is an integer from 2 to 6;

or a nontoxic acid addition salt thereof.

2. A compound according to claim 1 wherein
   $R^1$ and $R^2$ when taken independently of one another are (lower)alkyl of one to three carbon atoms;
   $R^4$ is hydrogen, methyl, methoxy, chloro, bromo, fluoro or nitro;
   $R^5$ is alkyl of from one to four carbon atoms or phenyl, unsubstituted or substituted by one methyl, methoxy, chloro, bromo, fluoro or nitro group;
   each of $R^6$ and $R^7$, independent of the other, are hydrogen or methyl;
   $n$ is 0 or 1, and
   $m$ is 0.

3. The compound to claim 1 which is diphenyl-imidazolyl-acetic acid dimethylamino-ethyl ester.

4. The compound according to claim 1 which is diphenyl-imidazolyl-acetic acid 1-diethylamino-3-propylamide.

5. The compound according to claim 1 which is diphenyl-imidazolyl-acetic acid 1-dimethylamino-2-propyl ester.

6. The compound according to claim 1 which is diphenyl-imidazolyl-acetic acid 2-dimethylamino-2,3-dimethyl-3-butyl ester.

7. The compound according to claim 1 which is diphenyl-imidazolyl-acetic acid morpholino-ethyl ester.

8. The compound according to claim 1 which is diphenyl-imidazolyl-acetic acid 1-morpholino-2-propyl ester.

9. The compound according to claim 1 which is diphenyl-imidazolyl-acetic acid diethylamino-propyl ester.

10. The compound according to claim 1 which is diphenyl-imidazolyl-acetic acid methyl-ethylamino-ethyl ester.

11. The compound according to claim 1 which is 4,4'-dichloro-diphenyl-imidazolyl-acetic acid dimethyl-aminoethyl ester.

12. The compound according to claim 1 which is diphenyl-imidazolyl-acetic acid 1-dimethylamino-3-propyl-amide.

13. The compound according to claim 1 which is diphenyl-imidazolyl-acetic acid 2-dimethylamino-3-propylamide.

* * * * *